United States Patent
Rama Krishna et al.

(10) Patent No.: US 11,870,305 B2
(45) Date of Patent: Jan. 9, 2024

(54) SYSTEM AND METHOD FOR REDUCED ROTOR LOSSES

(71) Applicants: Rolls-Royce Singapore Pte. Ltd., Singapore (SG); Rolls-Royce plc, London (GB)

(72) Inventors: Shanmukha Rama Krishna, Sengkang (SG); Malaiyan Karthikeyan Srihariharan, Singapore (SG); Ellis Fui Hen Chong, Derby (GB)

(73) Assignees: Rolls-Royce Singapore Pte. Ltd., Singapore (SG); Rolls-Royce plc, London (GB)

(*) Notice: Subject to any disclaimer, the term of this patent is extended or adjusted under 35 U.S.C. 154(b) by 184 days.

(21) Appl. No.: 17/208,444

(22) Filed: Mar. 22, 2021

(65) Prior Publication Data

US 2022/0302777 A1  Sep. 22, 2022

(51) Int. Cl.
*H02K 1/02* (2006.01)
*H02K 1/28* (2006.01)
*H02K 1/276* (2022.01)
*H02K 11/01* (2016.01)
*H02K 1/16* (2006.01)

(52) U.S. Cl.
CPC ............ *H02K 1/276* (2013.01); *H02K 1/165* (2013.01); *H02K 11/01* (2016.01); *H02K 2213/03* (2013.01)

(58) Field of Classification Search
CPC ........ H02K 1/276; H02K 1/165; H02K 11/01; H02K 2213/03; H02K 15/03; H02K 1/278
See application file for complete search history.

(56) References Cited

U.S. PATENT DOCUMENTS

| | | | |
|---|---|---|---|
| 2,949,555 A | 8/1960 | Paul | |
| 5,801,470 A | 9/1998 | Johnson et al. | |
| 7,675,213 B2 | 3/2010 | Tenhunen | |
| 7,902,700 B1 | 3/2011 | Gabrys | |
| 8,247,938 B2 | 8/2012 | Saban et al. | |
| 10,122,229 B2 | 11/2018 | Arai | |
| 2008/0238234 A1* | 10/2008 | Saban .................... | H02K 1/278 310/156.31 |
| 2010/0019602 A1 | 1/2010 | Saban et al. | |
| 2015/0188369 A1 | 7/2015 | Arimatsu | |
| 2018/0316247 A1 | 11/2018 | Andonian et al. | |

FOREIGN PATENT DOCUMENTS

| | | |
|---|---|---|
| DE | 102012205361 A1 | 10/2013 |
| EP | 1976096 A2 | 10/2008 |
| EP | 3468005 A1 | 4/2019 |

OTHER PUBLICATIONS

U.S. Appl. No. 17/208,482, filed Mar. 22, 2021, by Chong et al.

* cited by examiner

*Primary Examiner* — Thomas Truong
(74) *Attorney, Agent, or Firm* — Shumaker & Sieffert, P.A.

(57) ABSTRACT

A rotor assembly includes a plurality of segmented magnets disposed about an outer surface of a rotor core and a plurality of segmented metallic bands configured to secure the plurality of segmented magnets to the outer surface of the rotor core. The number of segments of the segmented metallic bands in an axial direction is greater than the number of segments of the segmented magnets.

11 Claims, 7 Drawing Sheets

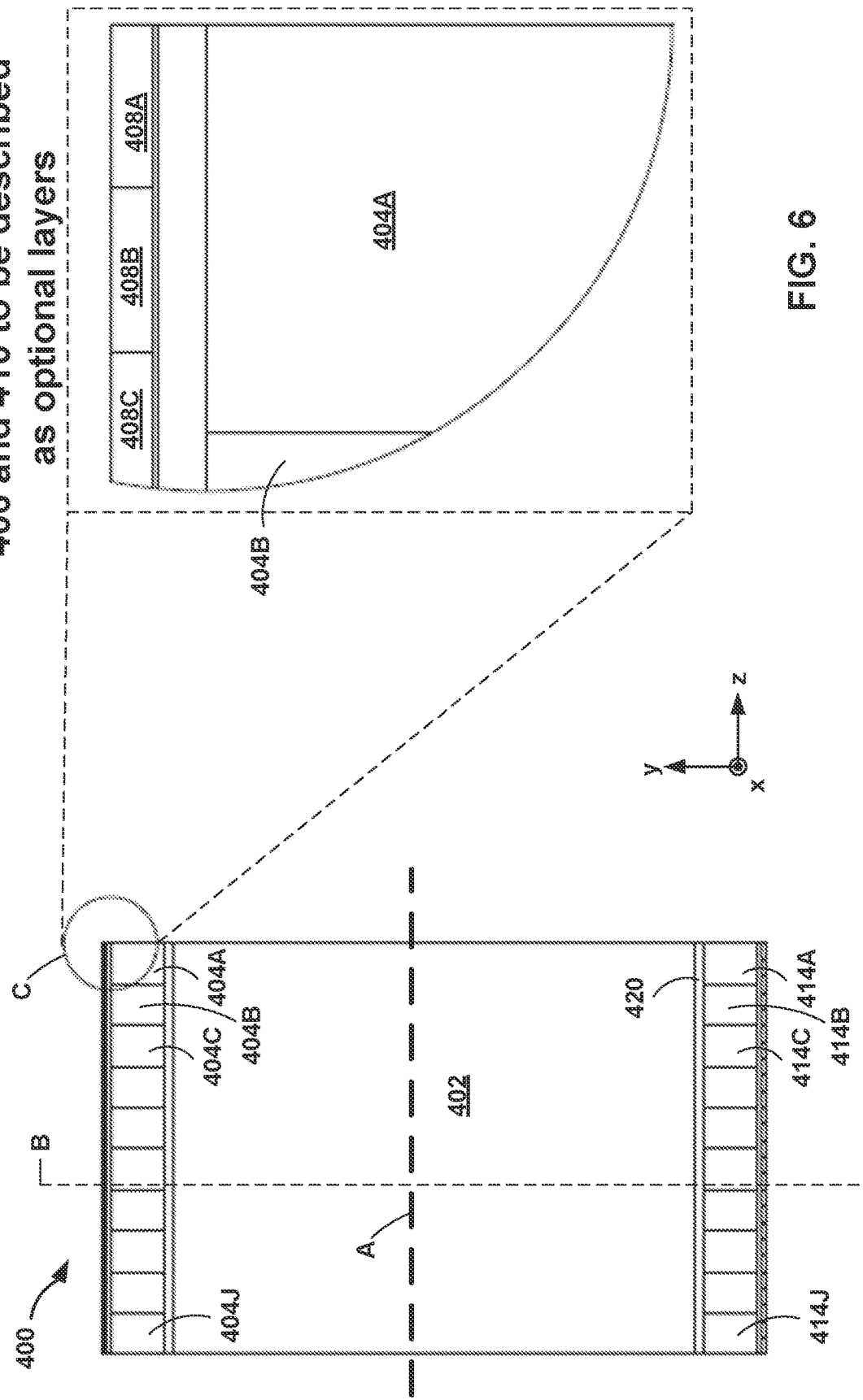

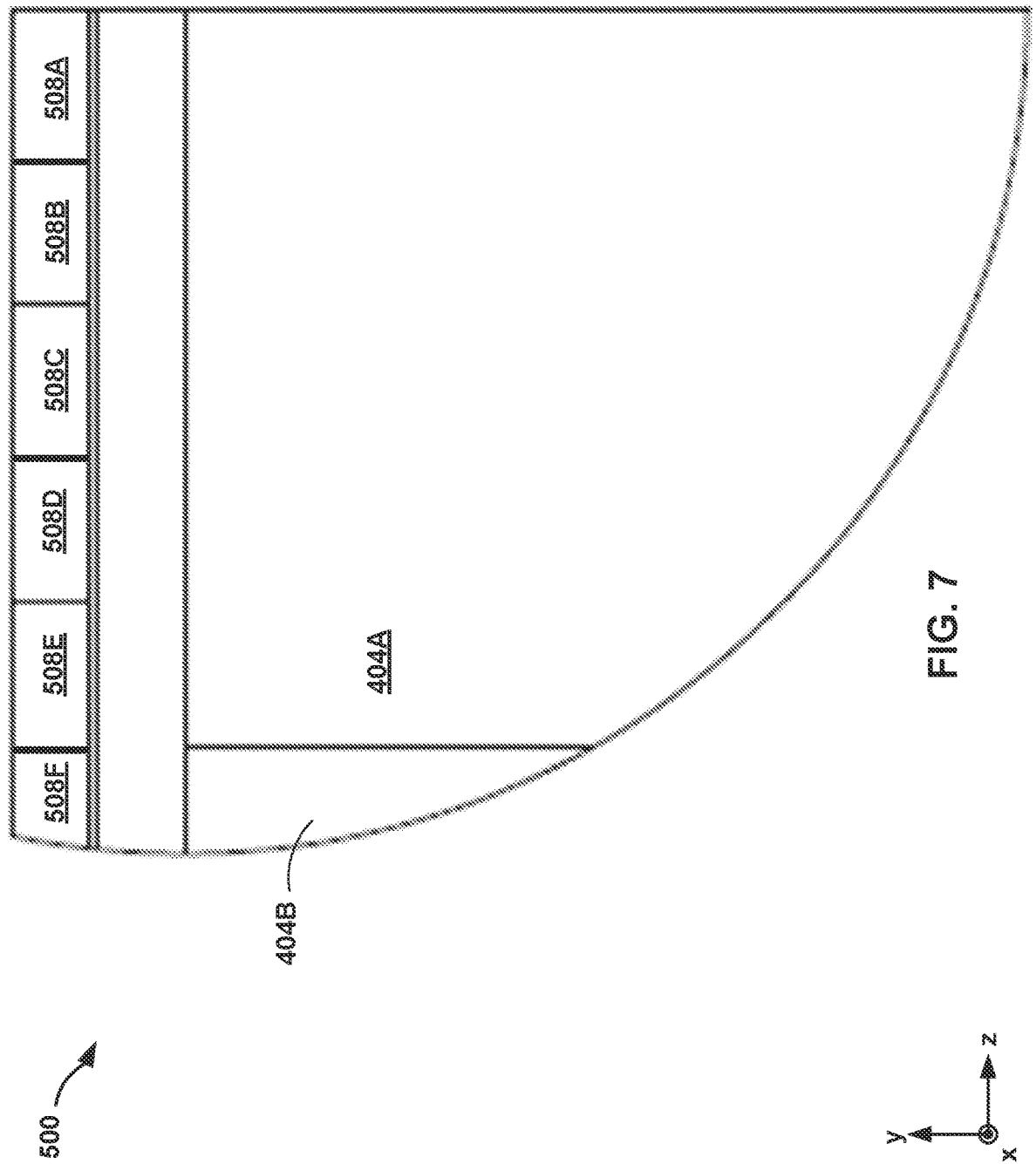

SYSTEM AND METHOD FOR REDUCED ROTOR LOSSES

TECHNICAL FIELD

This disclosure relates to electric machines.

BACKGROUND

Electric machines covert between electrical energy and mechanical energy. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts the rotating magnetic field to electric energy.

SUMMARY

In one example, this disclosure describes a method including selecting a first number of segments of a plurality of segmented metallic bands that is greater than a number of segments of a plurality of magnet segments, wherein the plurality of segmented magnets are configured to be disposed about an outer surface of a rotor core, wherein the plurality of segmented metallic bands are configured to secure the plurality of segmented magnets to the outer surface of the rotor core; determining a first axial length of each segment of the plurality of segmented bands that reduces an eddy current loss of a rotor assembly including both the plurality of segmented magnets and the plurality of segmented metallic bands; and determining a second number of segments of the plurality of segmented metallic bands based on the first axial length.

In another example, this disclosure describes a rotor assembly including a plurality of segmented magnets disposed about an outer surface of a rotor core; a plurality of segmented metallic bands configured to secure the plurality of segmented magnets to the outer surface of the rotor core, wherein the number of segments of the segmented metallic bands in an axial direction is greater than the number of segments of the segmented magnets.

In another example, this disclosure describes an electric machine including a rotor assembly, the rotor assembly including a plurality of segmented magnets disposed about an outer surface of a rotor core; a plurality of segmented metallic bands configured to secure the plurality of segmented magnets to the outer surface of the rotor core, wherein the number of segments of the plurality of segmented bands in an axial direction is greater than the number of segments of the plurality of segmented magnets.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a cross-sectional diagram of a rotor assembly, in accordance with one or more techniques of this disclosure.

FIG. 6 is cross-sectional diagram of a portion of the rotor assembly of FIG. 5, in accordance with one or more techniques of this disclosure.

FIG. 7 is cross-sectional diagram of a portion of another rotor assembly similar to that of FIG. 6, in accordance with one or more techniques of this disclosure.

DETAILED DESCRIPTION

Figure 1:
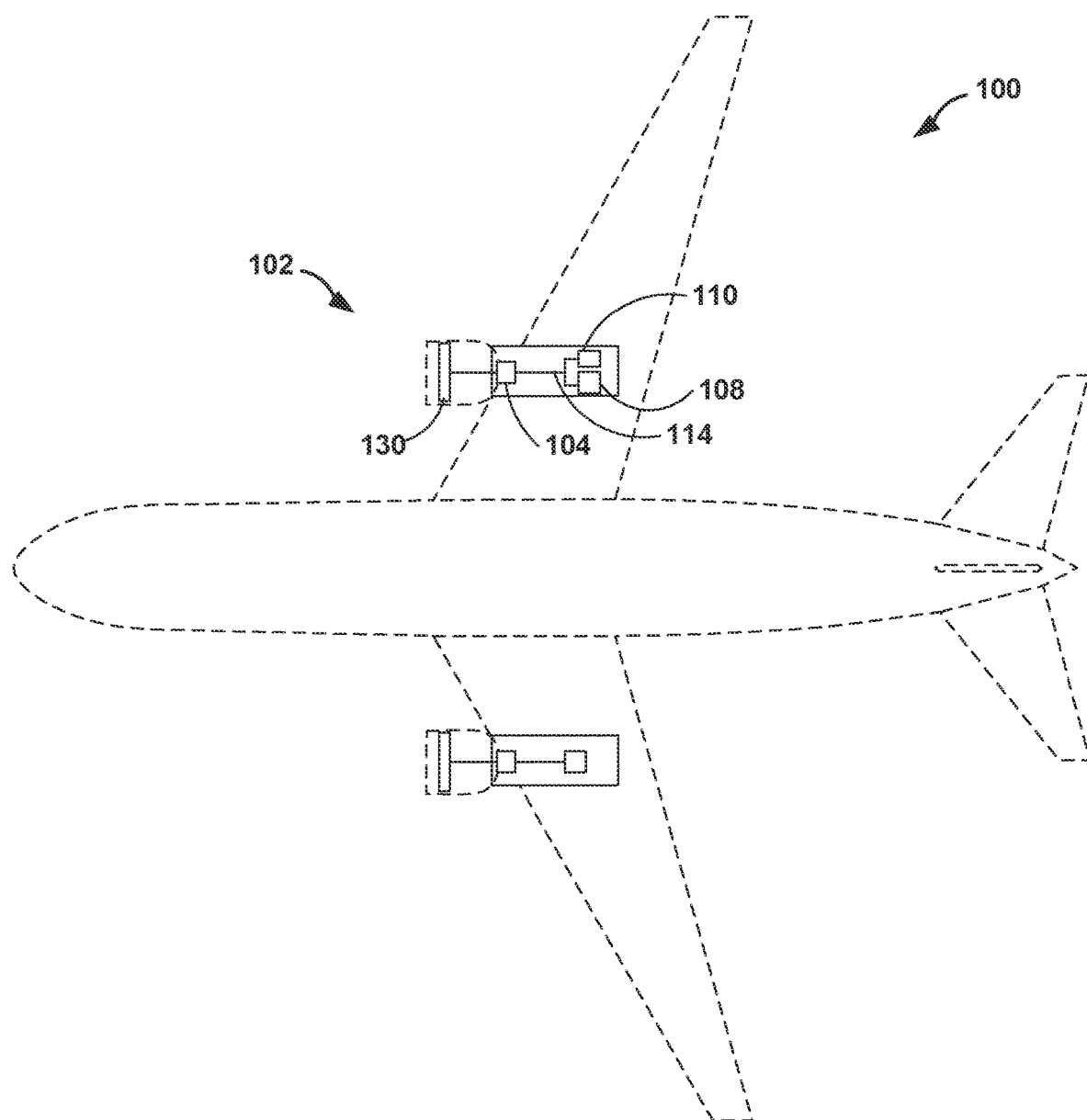
FIG. 1 is a conceptual diagram of a vehicle that includes an electric machine, in accordance with one or more techniques of this disclosure.

Electric machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle. An electric machine may operate in various modes at different times. For instance, a particular electric machine may operate as a starter to start a combustion motor at a first time and operate as a generator to convert rotational mechanical energy generated by the combustion motor into electrical energy at a second time. In this way, an electric machine may operate as an electrical starter-generator.

An electric machine may include a rotor that rotates relative to a stator. The rotor may include magnets, e.g., permanent magnets (PMs), disposed around a cylindrical body of the rotor. Magnetic fields of the magnets of the rotor interact with magnetic fields generated by windings included in the stator to transfer energy. The rotor may include metallic banding, e.g., one or more metallic bands and/or rings, configured to secure the magnets to the rotor against centrifugal forces, e.g., when the rotor is in operation and is rotating. The stator may transfer energy to, or receive energy from, the rotor via interaction between magnetic fields generated by the stator windings and magnetic fields generated by the rotor. For example, an alternating current may be applied to the stator windings in a motor which may cause alternating magnetic fields. Interaction between magnetic fields generated by the magnets of the rotor and the alternating magnetic fields may transfer and convert the electrical energy in the stator windings to mechanical motion (e.g., rotation) of the rotor. Similarly, rotation of the rotor in a generator may cause alternating magnetic fields which may transfer and convert the mechanical energy of the motion of the rotor to electrical energy in the stator windings via induction of a current in the windings by the alternating magnetic fields. However, the alternating magnetic fields in an electric machine (e.g., motor or generator) may also induce eddy currents in conductors that are within the magnetic fields, such as the magnets and the metallic banding of the rotor. Such eddy currents are energy losses between the rotor and stator because at least some of the energy to be transferred between the rotor and the stator is coupled into the induced eddy currents, at least a portion of which is ultimately converted to heat via resistance in the material (e.g., the metallic banding and/or magnets). Additionally, eddy currents may cause, at least in part, demagnetization of the permanent magnets, lower the magnetic performance and toque capability of the rotor assembly and/or electric machine, and may cause thermal expansion in one or more components that may reduce the structural integrity of the rotor assembly and/or electric machine, each of which may need to be compensated for thereby adding cost and/or weight to the electric machine.

In accordance with one or more techniques of this disclosure, the metallic banding and magnets may be segmented to reduce losses caused by eddy currents. For example, the permanent magnets may be segmented in the axial direction, and the metallic banding may be segmented in the axial direction into "bands" and/or "rings." The segmenting of the magnets and the metallic banding may limit the amount of energy that can be coupled into the eddy currents. For example, eddy currents flow in closed loops perpendicular to the plane of the magnetic field, and the reduction in axial length of the magnets and/or metallic banding via segmenting compresses the size of the potential eddy current loop and the amount of energy that can be coupled into the current loop.

Determining the segmenting of the magnets and the metallic banding, e.g., the number and axial length of each segment of the magnets and metallic bands, may be complex. For example, segmenting of both the magnets and the metallic banding may be constrained by magnetic and electrical performance as well as mechanical and thermal constraints, which may reduce the degree of freedom to select the segmenting in order to reduce eddy current losses. In some examples, the thickness and axial length of the segmented magnets may be determined based on performance constraints, e.g., the torque required of the rotor assembly. In some examples, the thickness of the segmented metallic bands may be constrained by mechanical constraints, e.g., the ability to secure the segmented magnets about the rotor core against centrifugal forces during operation of the rotor assembly. In some examples, the thickness and axial length of one or both of the segmented magnets and segmented bands may be constrained by thermal constraints, e.g., a threshold temperature and/or thermal load of each magnet and/or metallic band segment.

Additionally, there may be interactions causing the eddy currents in the segmented magnets and segmented metallic bands to be interrelated such that changing the segmenting of one affects the eddy currents of the other and/or both. Harmonics of the alternating magnetic field may cause eddy currents in one or both of the segmented magnets and segmented metallic bands, and changing the segmentation of one or both of the segmented magnets and/or the segmented metallic bands, e.g., the number and axial length of the segments, may change the coupling of the harmonics to the eddy currents in one or both of the segmented magnets and segmented metallic bands resulting in a change in the eddy currents in one or both of the segmented magnets and segmented metallic bands. For example, if the segmentation of the metallic bands is increased, e.g., the number of metallic band segments is increased and the length of each metallic band segment is decreased, while the segmentation of the magnets is kept the same, the eddy currents and losses in the segmented banding may reduce while the eddy currents and losses in the segmented magnets may increase. In some examples, changing the segmentation to the reduce eddy currents in one of the magnets and/or metallic bands may increase the total eddy current of the rotor assembly, e.g., via an increase in the eddy currents of the other of the magnets and/or metallic bands.

In accordance with one or more techniques of this disclosure, a method of determining a number of segments of segmented metallic bands may include selecting a first number of metallic banding segments that is greater than the number of segments of magnets, determining a first axial length of each segment of metallic bands that reduces an eddy current loss of the rotor assembly, and determining a second number of segments of metallic bands based on the determined axial length. For example, determining the first axial length of each segment of the metallic bands may include determining one or more magnetic field harmonics causing eddy current losses in the rotor assembly, e.g., either the segmented magnets, the segmented metallic bands, or both, and determining which of the magnetic field harmonics is the dominant harmonic frequency resulting in eddy current losses in the rotor assembly, e.g., a first dominant harmonic frequency. A skin depth may be determined based on the dominant magnetic field harmonic frequency, and the axial length of the segments of the segmented metallic bands may be determined based on the skin depth and may be selected to be less than or equal to the skin depth. In some examples, a ratio of the first number of metallic banding segments to the number of segments of magnets is based on the electrical conductivities and relative permeabilities of the metallic banding and the magnets and may be greater than or equal to 2.0. In some examples, a ratio of the conductivity of metallic banding segments to the conductivity of segments of magnets may be greater than or equal 2.0.

In some examples, the method may be iterative. For example, once the axial length of the segmented metallic bands is determined and selected, the harmonics causing eddy currents and the amount of energy coupled to those eddy currents may change for both the segmented magnets and the segmented metallic bands. The method may then further include determining a second dominant harmonic frequency, which may be different from the first dominant harmonic frequency and determining a second skin depth based on the second dominant frequency. The method may further include determining the axial length of the segments of the segmented metallic bands based on the second skin depth and the axial length may be selected to be less than or equal to the second skin depth. In some examples, the method may include further iterations until an axial length constraint is reached, a thermal load and/or segment temperature threshold due to eddy current heating is reached, and/or an eddy current loss threshold is reached.

In accordance with this disclosure, a rotor assembly may include a plurality of segmented magnets disposed about an outer surface of a rotor core and a number of segments of a plurality of segmented bands in an axial direction is greater than the number of segments of the segmented magnets. In some examples, the axial length of each segment of the plurality of segmented metallic bands may be less than or equal to the electrical skin depth of the dominant frequency of a rotor loss, e.g., due to eddy currents. In some examples, the ratio of number of segments of the segmented metallic bands to the number of segments of the segmented magnets is at least 2.0, and the ratio of the number of segments of the segmented metallic bands to the number of segments of the segmented magnets is a predetermined number selected such that at least one eddy current harmonic is reduced In some examples, one or more techniques and/or example rotor assemblies of this disclosure may disclose a rotor assembly and method of designing a rotor assembly with reduced eddy current losses. For example, the techniques disclosed may enable segmentations of magnets and metallic banding that reduce eddy current losses to be determined, e.g., segmentations that would otherwise be difficult to determine because of an interdependence of eddy currents in the magnets and metallic bands on the segmentations of each other, such as an increase in segmentation of the metallic banding that reduces the eddy currents in the metallic banding resulting in an increase in the eddy currents in the magnets and an increase in the total eddy current loss of the rotor assembly.

FIG. 1 is a conceptual diagram of a vehicle 100 that includes an electric machine, in accordance with one or more techniques of this disclosure. In some examples, vehicle 100 is an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine. Propulsion system 102 includes motor 104 that is configured to drive propulsor 130. Propulsion systems that include gas-turbine engines may include electric generator 108 that may both start the gas-turbine engines and generate electrical power using mechanical energy generated by the gas-turbine engines. As shown in FIG. 1, propulsion system 102 may include generator 108 and energy storage system (ESS) 110 coupled to electrical bus 114, and motor 104 coupled to electrical bus 114.

In accordance with one or more techniques of this disclosure, motor 104 and/or generator 108 may include a permanent magnet rotor assembly including a metallic banding system. In some examples, the metallic banding system may include a plurality of segmented magnets disposed about an outer surface of a rotor core and a plurality of segmented metallic bands configured to secure the plurality of segmented magnets about the outer surface of the rotor core. In some examples, the number of segments of the segmented metallic bands in the axial direction, e.g., parallel with the longitudinal dimension of the rotor core, is greater than the number of segments of the segmented magnets. In some examples, a ratio of the number of segments of the segmented metallic bands to the number of segments of the segmented magnets is at least 2.0 and/or selected such that at least one eddy current harmonic is reduced.

In some examples, the axial length of each segment of the plurality of segmented metallic bands is less than or equal to the electrical skin depth of the dominant frequency of a rotor loss. For example, in operation, the power electronics of an electric machine, e.g., motor 104 and/or generator 108, may generate magnetic field harmonics of varying strength, each of which may induce eddy currents in the segmented magnets and/or segmented metallic bands. Electric current, including eddy currents, flow mainly between the outer surface of a conductor and the skin depth, which depends on the electrical conductivity and magnetic permeability of the conductor as well as the frequency of the alternating current. For frequencies that are not near strong atomic or molecular resonances of the conductor, and that are below the plasma frequency of the conductor, the skin depth may be $$\delta(f) = \frac{1}{\sqrt{\pi \sigma \mu f}},$$

where σ=the electrical conductivity of the conductor, μ=the magnetic permeability of the conductor, and f=the frequency of the alternating current, e.g., the eddy current, in the conductor. The power electronics of the electric machine may generate a plurality of harmonic frequencies, e.g., in the alternating currents of the windings which generate harmonics in the alternating magnetic fields generated by the windings, ultimately generating/inducing alternating eddy currents in the segmented magnets and/or segmented metallic bands at the plurality of harmonic frequencies. A dominant frequency, e.g., a dominant harmonic frequency (or frequencies), is the frequency (or frequencies) at which the most energy is generated/induced/coupled into an eddy current (or currents). In other words, a dominant frequency or dominant harmonic frequency is the frequency which dominates rotor energy loss and/or energy loss in the electric machine, e.g., due to coupling that energy into one or more eddy currents in one or more of the plurality of segmented metallic bands, the plurality of segmented magnets, or some other conductor Segmenting the metallic banding such that the axial length of each segmented metallic band is less than the skin depth of the dominant harmonic frequency and/or frequencies may reduce the amount of energy coupled into eddy currents at that frequency, or may eliminate those eddy currents. In some examples, the overall energy losses caused by eddy currents may thereby be reduced. In some examples, motor 104 and/or generator 108 may include a permanent magnet rotor assembly including a number of segments of segmented metallic bands in the axial direction that greater than the number of segments of the segmented magnets, and a permanent magnet rotor assembly including segmented metallic bands comprising segments that each have an axial length that is less than or equal to the electric skin depth of the dominant frequency of rotor loss, e.g., rotor loss due to energy coupled into eddy currents at harmonic frequencies.

Figure 2:
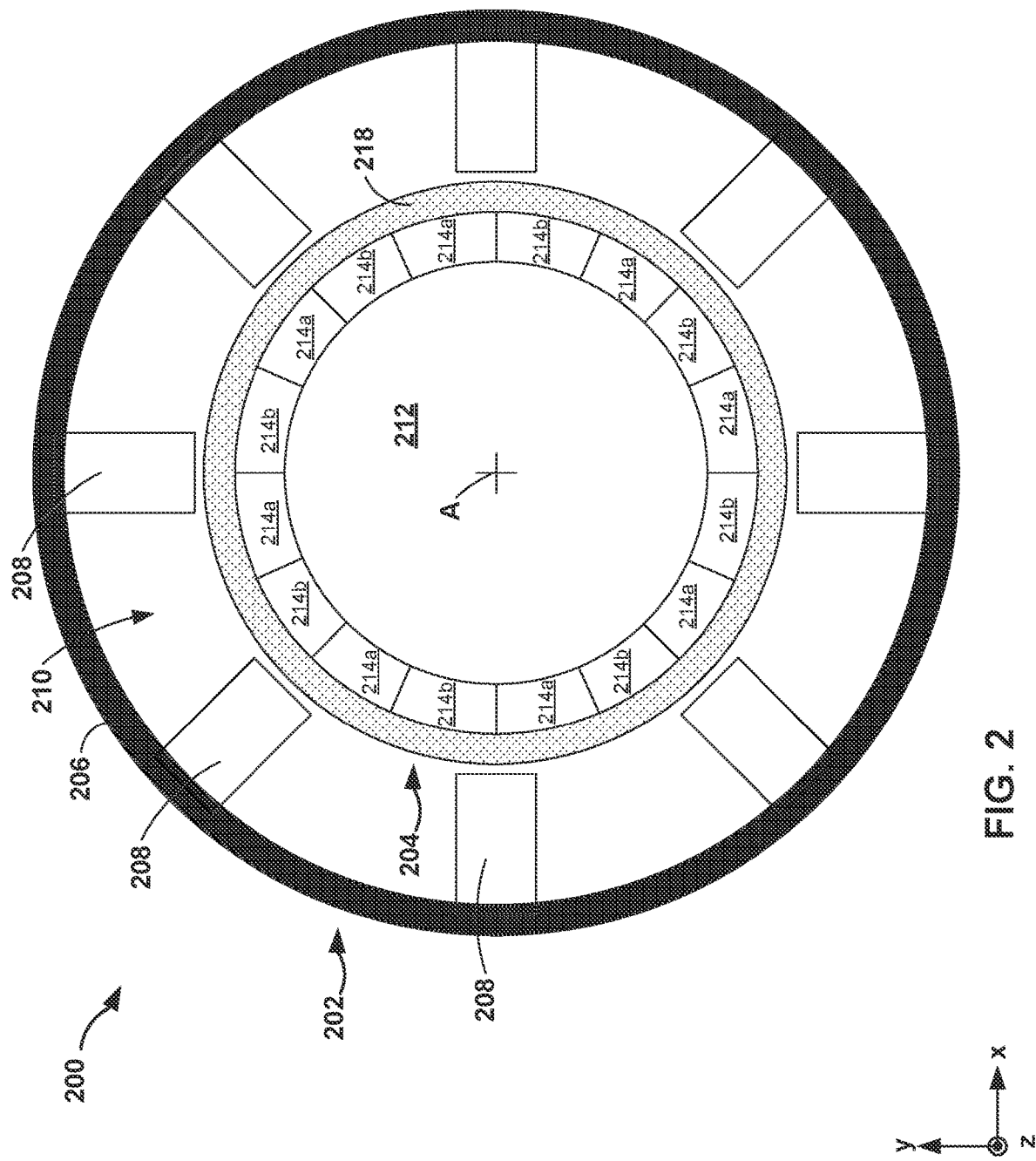
FIG. 2 is a cross-sectional diagram of an electric machine, in accordance with one or more techniques of this disclosure.

FIG. 2 is a perspective view of an electric machine 200, in accordance with one or more techniques of this disclosure. In the example shown, electric machine 200 includes stator 202 and rotor assembly 204. In some examples, electric machine 200 may be either, or both, of an electric generator configured to convert mechanical energy to electrical energy or an electric motor configured to convert electrical energy to mechanical energy.

In the examples shown, stator 202 includes base portion 206 and a plurality of stator teeth 208. Stator teeth 208 may project radially inward towards longitudinal axis A of rotor assembly 204 from base portion 206. In some examples, the plurality of stator teeth 208 may be disposed circumferentially around longitudinal axis A, e.g., about the z-axis as illustrated. In some examples, stator 202 may have a length that is substantially the entire length of electric machine 200 and/or rotor assembly 204, e.g., along longitudinal axis A in the z-direction. In other examples, electric machine 200 may include a plurality of stators 202 disposed along a longitudinal axis A in the z-direction, each stator 202 having a length that is substantially less than the length of electric machine 200 and/or rotor assembly 204. In some examples, stator teeth 208 may define a plurality of slots 210 between stator teeth 208. A plurality of stator windings (not shown) may be wound around the plurality of stator teeth 208 and at least partially filling stator slots 210.

In the example shown, rotor assembly 204 includes rotor core 212, a plurality of magnet pairs 214a and 214b of opposite polarity (collectively referred to as magnets 214) disposed on or about the surface of rotor core 212, and metallic banding 218. As used herein, magnets of the "same polarity" have their magnetic poles oriented in the same direction, and magnets of the "opposite polarity" have their magnetic poles oriented in opposite directions. Namely, magnets do not have a particular polarity, but rather an orientation of their magnetic poles. For ease of description, magnets described as having the "same polarity" or "opposite polarity" relative to each other as used herein means that the magnets are oriented with like poles (e.g., their magnetic north and south poles) oriented in the same direction or opposite direction, respectively, relative to each other. For example, the magnetic north and south poles of magnets 214a and 214b may be oriented opposite to each other such that the north magnetic pole of magnet 214a may be at the end of magnet 214a in the positive z-direction and its south magnetic pole may be at its end in the negative z-direction, and the opposite may be true for magnet 214b.

In some examples, rotor core 212 may optionally have a coating and/or layer (not shown in FIG. 2) disposed on its outer surface, and magnets 214 may be disposed on the outer surface of such a coating and/or layer. Metallic banding 218 may be configured to secure magnets 214 to the outer surface of rotor core 212 or the outer surface of a coating and/or layer on the outer surface of rotor core 212. In some examples rotor core 212 may be a hollow shell and/or drum, and in other examples rotor core 212 may be a solid core. In some examples, rotor core 212 may be and/or include a drive shaft, or rotor core 212 may be mechanically coupled to a drive shaft in other examples.

When electric machine 200 is operating as a generator, a torque may be applied to rotor assembly 204, e.g., via rotor core 212 as a drive shaft. The rotation of rotor assembly 204 may cause an alternating magnetic field at each of stator teeth 208 due to the rotation of the magnet pairs 214a and 214b. The alternating magnetic fields may induce a current, e.g., and alternating current (AC) to flow in the windings of stator 202, thereby converting the mechanical energy (rotation) of the rotor into electrical energy in the windings. When electric machine 200 is operating as a motor, the opposite conversion may occur. Namely, AC flowing through the windings of stator 202 may cause alternating magnetic fields, which interact with magnets 214 to induce a torque on rotor assembly 204 thereby converting the electrical energy in the windings to mechanical energy of the rotor assembly.

In some examples, the alternating magnetic fields may induce eddy currents in conductors located within the fields, e.g., magnets 214, metallic banding 218, etc. To reduce eddy currents, magnets 214 (e.g., each of the magnets 214a and 214b about the circumference of rotor core 212) and metallic banding 218 may be segmented in the axial direction into a plurality of segmented magnets 214 and a plurality of segmented metallic bands 218, e.g., along longitudinal axis A in the z-direction (not visible in the cross-section of FIG. 2 but illustrated in FIGS. 3-6).

In accordance with one or more techniques of this disclosure, rotor assembly 204 may include a permanent magnet rotor assembly including a metallic banding system. In some examples, the metallic banding system may include a plurality of segmented magnets 214a, 214b disposed about an outer surface of rotor core 212 and a plurality of segmented metallic bands 218 (segmenting not visible in the cross-sectional view of FIG. 2) configured to secure the plurality of segmented magnets 214a, 214b about the outer surface of the rotor core 212. In some examples, the number of segments of the segmented metallic bands 218 in the axial direction, e.g., parallel with the z-axis as shown, is greater than the number of segments of the segmented magnets 214a, 214b. In some examples, a ratio of the number of segments of the segmented metallic bands 218 to the number of segments of the segmented magnets 214a, 214b is at least 2.0 and/or selected such that at least one eddy current harmonic is reduced.

In some examples, the axial length of each segment of the plurality of segmented metallic bands 218 is less than or equal to the electrical skin depth of the dominant frequency of a rotor loss, e.g., similar to as described above with reference to FIG. 1.

In some examples, rotor assembly 204 may include a number of segments of segmented metallic bands 218 in the axial direction that greater than the number of segments of the segmented magnets 214a, 214b, and rotor assembly 204 may include segmented metallic bands 218 where each band has an axial length that is less than or equal to the electric skin depth of the dominant frequency of rotor loss, e.g., rotor loss due to energy coupled into eddy currents at harmonic frequencies.

Figure 3:
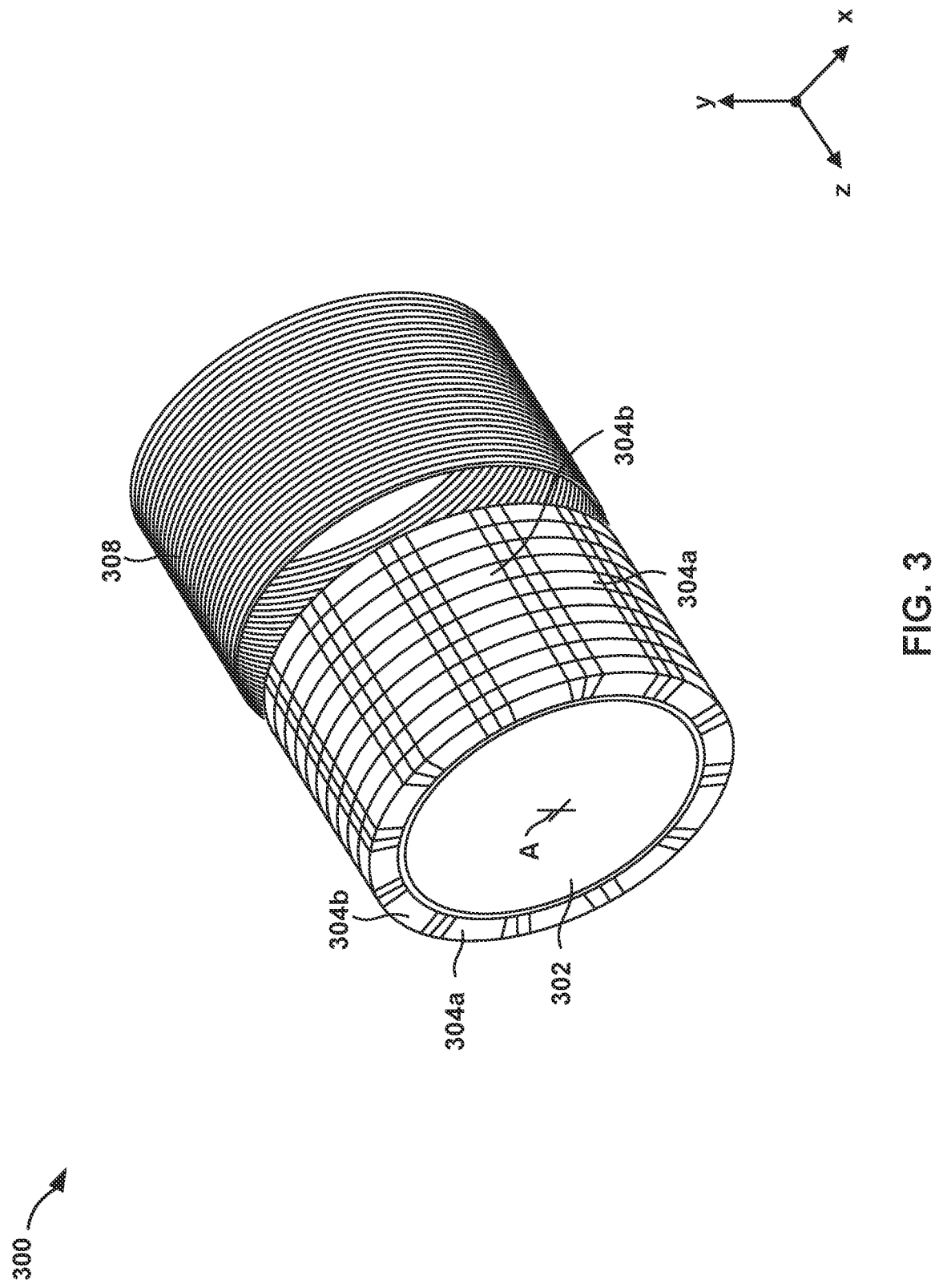
FIG. 3 is an exploded perspective view of a rotor assembly, in accordance with one or more techniques of this disclosure.
Figure 4:
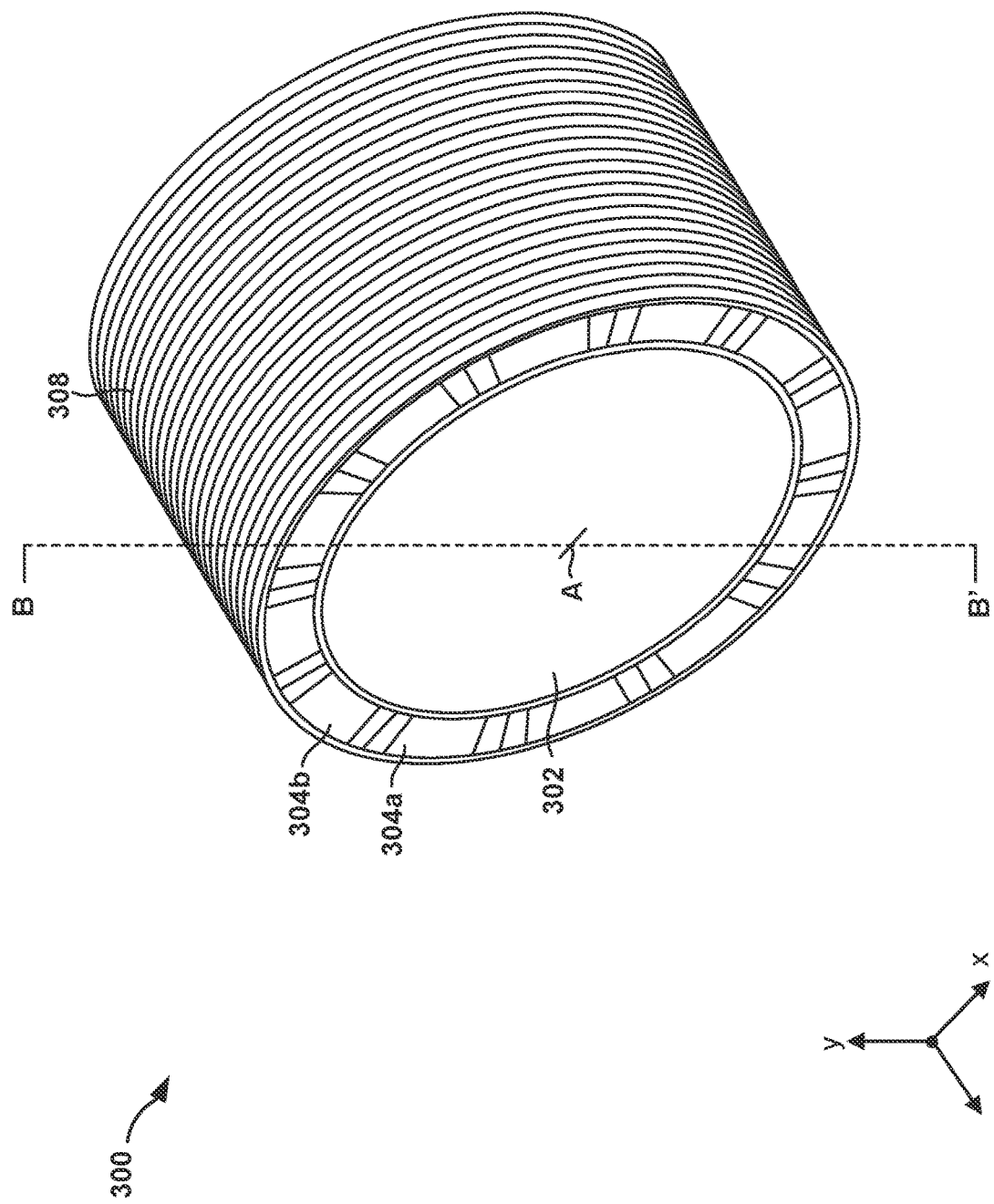
FIG. 4 is a perspective view of the assembled rotor assembly of FIG. 3, in accordance with one or more techniques of this disclosure.

FIGS. 3-4 are perspective views of a rotor assembly 300, in accordance with one or more techniques of this disclosure. FIG. 3 is an exploded perspective view of a rotor assembly 300, and FIG. 4 is a perspective view of the assembled rotor assembly 300.

In the example shown in FIG. 3, rotor assembly 300 includes rotor core 302, a plurality of magnet pairs 304a and 304b of opposite polarity and segmented in the axial direction and disposed on or about the surface of rotor core 302, plurality of segmented metallic bands 308, and (optionally) electrically insulating layer 310. The plurality of magnet pairs 304a and 304b may be collectively referred to as segmented magnets 304. In some examples, rotor core 302 may optionally have a coating and/or layer (not shown in FIGS. 3-4) disposed on its outer surface, and segmented magnets 304 may be disposed on the outer surface of such a coating and/or layer. In some examples, rotor core 302 may be an example of and may be the same as rotor core 212 described above. The plurality of segmented metallic bands 308 may be configured to secure segmented magnets 304 to the outer surface of rotor core 302 or the outer surface of a coating and/or layer on the outer surface of rotor core 302. Rotor assembly 300 may be an example of an assembled rotor assembly, e.g., after placing and positioning of the segmented magnets 304 and placing and positioning of the plurality of metallic bands 308.

The plurality of metallic bands 308 may be substantially similar to plurality of metallic bands 218 of FIG. 2, e.g., the plurality of metallic bands 308 may be configured to secure segmented magnets 304 to the outer surface of rotor core 302 or the outer surface of a coating and/or layer on the outer surface of rotor core 302. In the example shown, the plurality of metallic bands 308 includes twenty-five metallic bands or "rings," segmented to have equal axial lengths, however, rotor assembly 300 may include more or fewer segmented metallic bands 308. For example, rotor assembly 300 may include as few as two segmented metallic bands 308 of unequal lengths that together secure all of segmented magnets 304 to the outer surface of rotor core 302 (or the outer surface of any coatings/layers on the outer surface of rotor core 302). Generally, each segment or band of the plurality of segmented metallic bands 308 has an axial length that is less than the axial length of rotor assembly 300, and each band of the plurality of segmented metallic bands may be of equal or unequal axial length. In some examples, the number of segmented metallic bands 308 may be from one band to N bands, where N is any positive number. Typically, N may be the total axial length of rotor assembly 300 divided by the axial length of each metallic band (for metallic bands of equal length), and the axial length of each metallic band may be determined based on the skin depth of a dominant magnetic field frequency in the air gap between rotor assembly 300 and a stator (e.g., which may be determined based on the power electronics and stator with which rotor assembly 300 may be used). In some examples, the total axial length of the plurality of metallic bands 308 may be less than the total length of one or more components of rotor assembly 300, e.g., segmented magnets 304. For example, a portion of one or both ends of segmented magnets 304 may extend beyond the axial extent of the plurality of metallic bands 308. As another example, there may be gaps between each of the plurality of metallic bands 308 such that the sum of the axial lengths of the plurality of metallic bands is less than the axial length of one or more components of rotor assembly 300, and in some examples a portion of one or both ends of one or more components of rotor assembly 300 may or may not extend beyond the end-metallic band (e.g., the first and/or last metallic band in the axial direction) of the plurality of metallic bands 308 at each axial end of rotor assembly 300. In some examples, the total axial length of the plurality of metallic bands 308 may be greater than the axial length of one or more of the other components of rotor assembly 300, e.g., segmented magnets 304. For example, a portion of one or both end-metallic band (e.g., first and/or last metallic band in the axial direction) of the plurality of metallic bands 308 at one or both axial ends of rotor assembly 300 may axially extend beyond segmented magnets 304. In other examples, one or more metallic bands 308 may axially extend beyond one or more of the other components of rotor assembly 300. For example, at least some of the plurality of metallic bands 308 may be attached to each other, e.g., for support. In some examples, each band of the plurality of segmented metallic bands may have an axial length that is less than or equal to the electrical skin depth of the dominant frequency of a rotor loss, e.g., similar to as described above with reference to FIG. 1.

Each band of the plurality of segmented metallic bands may be configured to secure one or more of the segmented magnets 304 to rotor core 302, that is, each band is configured to have material properties such as thickness, stiffness/elasticity, brittleness, ductility/malleability, fracture toughness, hardness, fatigue strength, shear, tensile, and yield strengths, toughness, wear resistance, and the like to secure segmented magnets 304 during operation of the rotor assembly (e.g., rotation at high speeds) for a substantial amount of time, e.g., the useful life-time of rotor assembly 300 and/or an electric machine including rotor assembly 300.

In some examples, the number of segments of the segmented metallic bands 308 in the axial direction, e.g., parallel with the z-axis as shown, is greater than the number of segments of the segmented magnets 304a, 304b. In some examples, a ratio of the number of segments of the segmented metallic bands 308 to the number of segments of the segmented magnets 304a, 304b is at least 2.0 and/or selected such that at least one eddy current harmonic is reduced, e.g., the at least one eddy current harmonic is reduced in the segmented metallic bands 308, the segmented magnets 304a, 304b, both, or a total rotor assembly 300 eddy current harmonic.

FIGS. 5-7 are cross-sectional diagrams of at least an axial portion of a rotor assembly 400, in accordance with one or more techniques of this disclosure, are described together below. FIG. 5 is a cross-sectional diagram of at least an axial portion of rotor assembly 400 taken along the line B-B' as shown in FIG. 4, and FIG. 6 is a detailed view of a portion C of rotor assembly 400 illustrated in FIG. 5. FIG. 7 is cross-sectional diagram of a portion of another rotor assembly 500 similar to that of FIG. 6 but having different number of metallic banding segments that have a different axial length, in accordance with one or more techniques of this disclosure. Rotor assemblies 400 and 500 may be an example of, and may be substantially similar to, rotor assemblies 204 and 300 of FIGS. 2-3, respectively. The example of rotor assemblies 400, 500 shown in FIGS. 5-6 may illustrate examples of the relative sizes of the segmenting of the magnets and metallic banding, e.g., the relative axial lengths of the magnets and metallic bands. However, the magnets and metallic bands may have other axial lengths in other examples, and in general may have any axial lengths, e.g., that is less than the axial length of the entire rotor assemblies 400, 500. In the example shown, the relative radial thicknesses of the components may not be shown to scale or may not represent the radial thicknesses of the components of rotor assemblies 400, 500 relative to each other.

In the examples shown in FIG. 5, rotor assembly 400 includes rotor core 402, magnet segments 404A-404J and magnet segments 414A-414J, collectively referred to as segmented magnets 404 and 414, respectively, and a plurality of segmented metallic bands 408A-408C, collectively referred to as segmented metallic bands 408. In the example shown, rotor assembly 400 also includes rotor core coating/layer 420 disposed on the outer surface of rotor core 402. In some examples, rotor core coating/layer 420 may be a protective layer for rotor core 402 or may be an adhesive layer for at least partially holding and/or placing segmented magnets 404 and 414 on rotor core 402, or both. In some examples, rotor core 402 may be an example of and may be the same as rotor core 212 described above.

In the examples shown, each of segmented magnets 404A-404J may be of the same polarity. For example, segmented magnets 404A-404J may correspond to a plurality of segmented magnets of the same polarity located at a circumferential position along the axial length of the rotor core, e.g., an axial "row" of segmented magnets 304b as illustrated in FIG. 3. Segmented magnets 414A-414J may correspond to a plurality of segmented magnets of the same polarity located at a different circumferential position and along the length of rotor core 402. In the examples shown in FIGS. 4 and 5, segmented magnets 404 and 414 are of the same polarity, but in other examples segmented magnets 404 may be a different polarity from segmented magnets 414. For example, the circumferential position between segmented magnets 404 and 414 differs by 180 degrees, e.g., they are on opposite sides of rotor core 402 because in the examples shown, rotor assembly 400 is cylindrical and the cross-section is along the line B-B' which passes through longitudinal axis A of the cylindrical rotor assembly. Rotor assembly 400 may have axial "rows" of segmented magnets that have any suitable circumferential size and may have any number of axial "rows" of segmented magnets about its circumference. As such, in some examples, the segmented magnet axial "rows" on opposites sides of rotor assembly 400 may have the same polarity or may have the opposite polarity, depending on the circumferential size of each row, the size of any spacing between rows (e.g., zero spacing is illustrated in FIGS. 3-7), and the number rows about the circumference.

The plurality of metallic bands 408 may be substantially similar to plurality of metallic bands 218 and 308 of FIGS. 2 and 3-4, respectively, e.g., the plurality of metallic bands 408 may be configured to secure segmented magnets 404, 414 to the outer surface of rotor core 402 or the outer surface of rotor core coating/layer 420 on the outer surface of rotor core 402.

In the example shown in FIG. 7, rotor assembly 500 includes magnet segments 404A-404B and a plurality of segmented metallic bands 508A-508F, which may be similar the plurality of magnet segments 408A-408C but with a different axial length. In the example shown in FIG. 6, the metallic bands 408 have a shorter axial length than segmented magnets 404, e.g., there are 2.5 metallic bands for every segmented magnet in the axial direction in the example shown. In the example shown in FIG. 7, the metallic bands 508 have a different shorter axial length than segmented magnets, e.g., there are 5.0 metallic bands for every segmented magnet 404 in the axial direction in the example shown. In general, the axial length of both the segmented magnets 404, 414 and metallic bands 408, 508 may be any length less than the axial length of one or more components of rotor assembly 400, 500. In some examples, the length of any of individual segmented magnet 404, 414 and metallic band 408, 508 may vary along the entire axial length and about the circumference of rotor assembly 400. In some examples, the number of metallic band segments 408, 508 in the axial direction, e.g., parallel with the z-axis as shown, is greater than the number of magnet segments 404. In some examples, a ratio of the number of segments of the segmented metallic bands 408, 508 to the number of segments of the segmented magnets 404 is at least 2.0 and/or selected such that at least one eddy current harmonic is reduced. In some examples, each band of the plurality of segmented metallic bands 408, 508 may have an axial length that is less than or equal to the electrical skin depth of the dominant frequency of a rotor loss, e.g., similar to as described above with reference to FIG. 1.

In some examples, the total amount of energy and/or power coupled into eddy currents, and which harmonics are coupled, depends on the ratio of the number of segments of the segmented metallic bands 408, 508 to the number of segments of the segmented magnets 404 and/or the ratio of the lengths of the segments of the segmented metallic bands 408, 508 to the lengths of the segments of the segmented magnets 404 (which may be equivalent in some examples). For example, the total eddy current loss may decrease as the ratio of the number and/or lengths of metallic bands to magnet segments increases. In some examples, the total eddy current loss may be reduced by increasing the number (or decreasing the length) of metallic banding segments relative to the number (or length) of magnet segments, thereby increasing the ratio. In some examples, the total eddy current loss may be reduced by decreasing the number (or increasing the length) of magnet segments relative to the number (or length) of metallic banding segments, thereby increasing the ratio. In other words, eddy current losses may be reduced by increasing metallic banding segmentation relative to magnet segmentation, or by decreasing magnet segmentation relative to metallic banding segmentation.

Figure 8:
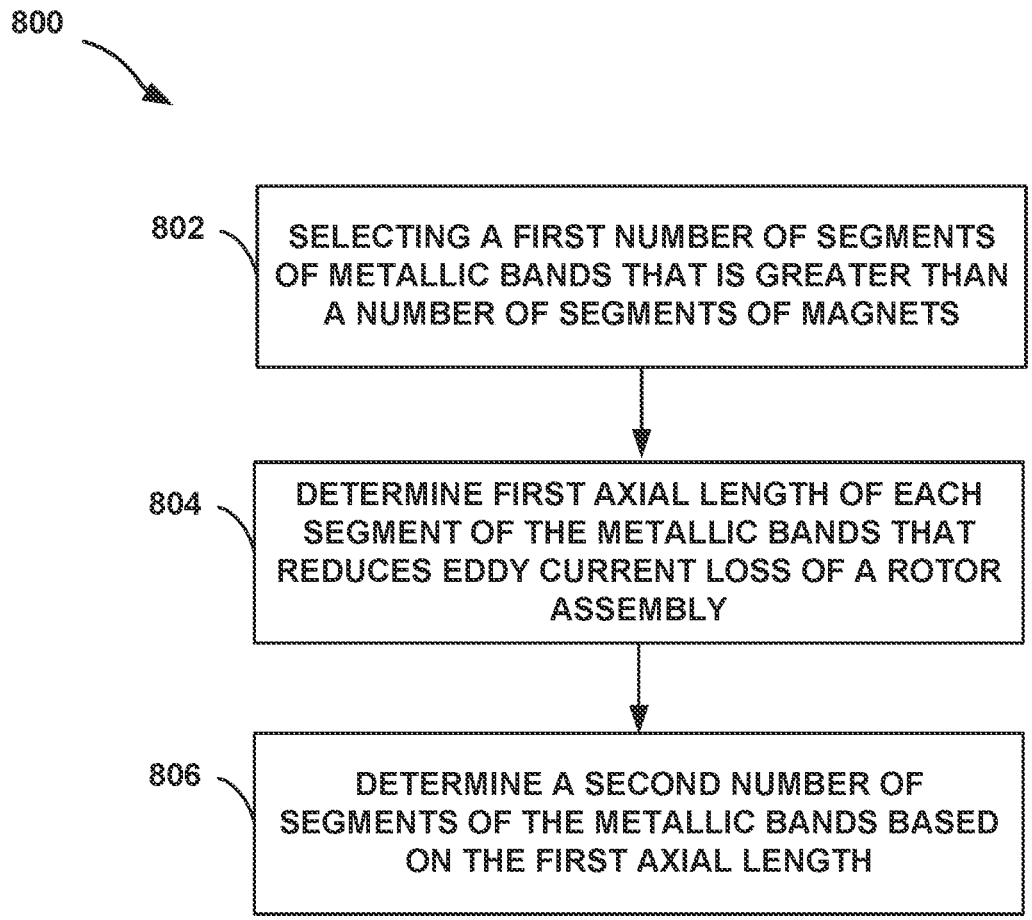
FIG. 8 is a flowchart of an example method of determining a number of segments of segmenting metal banding of a rotor assembly, in accordance with one or more techniques of this disclosure.

FIG. 8 is a flowchart of an example method 800 of determining a number of segments of segmenting metal banding of a rotor assembly, in accordance with one or more techniques of this disclosure. Although described with reference to rotor assembly 400 and FIGS. 5-6, the method shown may be used with any suitable electric machine and/or rotor assembly, e.g., motor 104, generator 108, electric machines 200, and/or rotor assemblies 300-500.

A rotor assembly fabricator, e.g., a person and/or computer aided rotor assembly machine, may select a first number of segments of a plurality of segmented metallic bands that is greater than a number of segments of a plurality of magnet segments (802). For examples, plurality of segmented magnets 404 may be configured to be disposed about an outer surface of rotor core 402 and plurality of segmented metallic bands 408 may be configured to secure plurality of segmented magnets 404 to the outer surface of the rotor core 402. In some examples, the rotor assembly fabricator may dispose segmented magnets, such as any of segmented magnets 304a, 304b, 404, or 414, on an outer surface of rotor core 402 and/or the outer surface of rotor core coating/layer 420. The segmented magnets, e.g., segmented magnets 404, 414, may be placed in "rows" in the axial direction, with alternating rows of segmented magnets having opposite polarity. In some examples, all of the segmented magnets 404, 414, may be the same, and oriented relative to each other such that they have their poles oriented in the same direction or in opposite directions. For example, all of the segmented magnets 404, 414, may be of the same size and be neodymium-iron-boron (NdFeB) rare-earth magnets, samarium cobalt (SmCo) magnets, aluminum-nickel-cobalt (Alnico) magnets, or ceramic or ferrite magnets, and may be positioned on rotor core 402 with an orientation that determines each magnet's "polarity." In other examples, all or some of the segmented magnets 404, 414 may be different sizes and be made of differing types and materials, e.g., NdFeB, SmCo, Alnico, or ceramic or ferrite, and may be positioned on rotor core 402 with an orientation that determines each magnet's "polarity." In some examples, rotor core 402 may first be coated and/or layered with rotor core coating/layer 420, e.g., a protective and/or adhesive coating and/or layer for at least partially holding and/or placing segmented magnets 404, 414 on rotor core 402. The rotor assembly fabricator may dispose a plurality of segmented metallic bands over the plurality of segmented magnets 404. For example, segmented metallic bands 408 may be press-fit onto and/or over the plurality of segmented magnets 404. In some examples, the rotor assembly fabricator may test rotor assembly 400 and determine the frequencies and amplitudes of harmonics that couple energy into eddy currents in one or more rotor assembly components, such as the segments of metallic bands 408 and the segments of segmented magnets 404, 414.

In some examples, the rotor assembly fabricator may computationally, numerically, and/or theoretically select a first number of segments of a plurality of segmented metallic bands that is greater than a number of segments of a plurality of magnet segments. For example, the rotor assembly fabricator may input a first number of segments of segmented metallic bands 408 that is greater than a first number of segments of segmented magnets 404, 414 in the axial direction, e.g., by a factor of 2.0 or greater, into a computer executing a program according to an algorithm or a model. For example, the rotor assembly fabricator may input the first number of segments of segmented metallic bands 408 and the first number of segments of segmented magnets 404, 414, along with any other suitable parameters, into a computer executing a rotor assembly model that may calculate outputs of the rotor based on the model, e.g., a finite element analysis (FEA) of the rotor assembly. The model may output a number of calculated performance attributes of the rotor assembly, e.g., the frequencies and amplitudes of harmonics that couple energy into eddy currents in one or more rotor assembly components, such as the segments of metallic bands 408 and the segments of segmented magnets 404, 414.

The rotor assembly fabricator may determine a first axial length of each segment of the plurality of segmented bands that reduces an eddy current loss of a rotor assembly including both the plurality of segmented magnets and the plurality of segmented metallic bands (804). For example, the rotor assembly fabricator may determine one or more alternating magnetic field harmonic frequencies that causes an eddy current loss in the rotor assembly and may determine a dominant alternating magnetic field harmonic frequency of eddy current loss in the rotor assembly, e.g., via testing an assembled rotor assembly 400 and/or via computational or numerical methods such as described above. The rotor assembly fabricator may then determine a skin depth based on the dominant alternating magnetic field harmonic frequency and may determine the first axial length of each segment of the plurality of segmented bands 408 based on the skin depth. In some examples, the first axial length may be less than or equal to the determined skin depth.

The rotor assembly fabricator may determine a second number of segments of the plurality of segmented metallic bands based on the first axial length (806). In some examples, the rotor assembly fabricator may determine a manufacturing feasibility of the first axial length, and may need to adjust the determined first axial and the first number of segments of metallic bands so as to balance manufacturing feasibility (e.g., thermal performance) and rotor loss, e.g., due to eddy currents.

For example, the rotor assembly fabricator may determine a thermal performance of the rotor assembly and/or electric machine based on the first axial length and/or first number of segments of the plurality of segmented metallic bands. For example, the rotor assembly fabricator may perform a thermal analysis, e.g., using a thermal FEA. In some examples, if the thermal performance of one or more components of the rotor assembly and/or electric machine does not satisfy certain performance criteria, e.g., such as a component temperature that is determined to be greater than a predetermined maximum temperature threshold, the rotor assembly fabricator may cause the axial length and/or number of segments of the plurality of segmented metallic bands 408 to be adjusted, e.g., to the second axial length and/or second number of segments. If the second axial length and/or number of segments of the plurality of segmented metallic bands 408 satisfies a manufacturing feasibility criteria, e.g., is less than or equal to the predetermined maximum temperature threshold, and the second axial length reduces an eddy current loss, e.g., the second axial length is less than or equal to the determined skin depth determined based on the dominant alternating magnetic field harmonic frequency of eddy current loss in the rotor assembly, then the rotor assembly fabricator may stop and determine the final number of metallic bands 408 and their axial length based on the second, adjusted axial length. In some examples, the manufacturing feasibility criteria may comprise a ratio of the number of segments of the plurality of segmented metallic bands to the number of segments of the plurality of magnet segments is a predetermined number that a thermal load in the plurality of segmented magnets that is less than a thermal threshold.

In some examples, the rotor assembly fabricator may determine the second number of segments of the plurality of segmented metallic bands based on the first axial length being less than or equal to the skin depth.

In some examples, if the second axial length and/or number of segments of the plurality of segmented metallic bands 408 does not satisfy both manufacturing feasibility and a threshold level of rotor loss reduction, the rotor assembly fabricator may again adjust the axial length of the segments of the segmented metallic bands 408, e.g., at step 804. For example, the rotor assembly fabricator may determine a third axial length of each segment of the plurality of segmented bands that reduces an eddy current loss of a rotor assembly including both the plurality of segmented magnets and the plurality of segmented metallic bands such as at (804), and subsequently determine the manufacturing feasibility of the third axial length such as at (806). In other words, the rotor assembly fabricator may cause steps (804) and (806) to execute repeatedly and/or in a loop until a predetermined set of criteria is satisfied, such as one or more eddy current loss thresholds, manufacturing feasibility, rotor assembly and/or electric machine component thermal thresholds, and the like. In some examples, if the criteria is satisfied, the rotor assembly fabricator may determine that the third (e.g., or latest or most current) number of segments of the metallic bands, e.g., the final determined number of segments of metallic bands at the last iteration of steps (804)-(806), is the final number of segments of metallic bands and may then end the method and/or loop.

The following examples may illustrate one or more aspects of the disclosure:

Example 1. A method comprising: selecting a first number of segments of a plurality of segmented metallic bands that is greater than a number of segments of a plurality of magnet segments, wherein the plurality of segmented magnets are configured to be disposed about an outer surface of a rotor core, wherein the plurality of segmented metallic bands are configured to secure the plurality of segmented magnets to the outer surface of the rotor core; determining a first axial length of each segment of the plurality of segmented bands that reduces an eddy current loss of a rotor assembly including both the plurality of segmented magnets and the plurality of segmented metallic bands; and determining a second number of segments of the plurality of segmented metallic bands based on the first axial length.

Example 2. The method of example 1, further comprising: determining one or more alternating magnetic field harmonic frequencies causing an eddy current loss in the rotor assembly.

Example 3. The method of example 2, further comprising: determining a dominant alternating magnetic field harmonic frequency of eddy current loss in the rotor assembly.

Example 4. The method of example 3, further comprising: determining a skin depth based on the dominant alternating magnetic field harmonic frequency.

Example 5. The method of example 4, wherein the first axial length of each segment of the plurality of segmented bands is based on the skin depth.

Example 6. The method of example 5, wherein the second number of segments of the plurality of segmented metallic bands is based on the first axial length being less than or equal to the skin depth.

Example 7. The method of any one of examples 1-6, further comprising: determining a second dominant alternating magnetic field harmonic frequency of eddy current loss in the rotor assembly; determining a second skin depth based on the dominant alternating magnetic field harmonic frequency; determining a second axial length of each segment of the plurality of segmented bands that is less than or equal to the second skin depth, wherein the second axial length of each segment of the plurality of segmented bands further reduces the eddy current loss of the rotor assembly; and determining a third number of segments of the plurality of segmented metallic bands based on the second axial length.

Example 8. The method of example 7, further comprising: determining whether the eddy current loss of the rotor assembly including the second number of segments of the plurality of segmented metallic bands causes a thermal load in the plurality of segmented magnets that is greater than a thermal threshold, wherein the second axial length of each segment of the plurality of segmented bands is further based on reducing the thermal load in the plurality of segmented magnets.

Example 9. The method of any one of examples 1-8, wherein a ratio of the first number of segments of the plurality of segmented metallic bands to the number of segments of the plurality of magnet segments is based on the electrical conductivities and the relative permeabilities of the plurality of segmented metallic bands and the plurality of magnet segments.

Example 10. The method of example 9, wherein the ratio of the first number of segments of the plurality of segmented metallic bands to the number of segments of the plurality of magnet segments is greater than or equal to 2.0.

Example 11. A rotor assembly comprising: a plurality of segmented magnets disposed about an outer surface of a rotor core; and a plurality of segmented metallic bands configured to secure the plurality of segmented magnets to the outer surface of the rotor core, wherein the number of segments of the segmented metallic bands in an axial direction is greater than the number of segments of the segmented magnets.

Example 12. The rotor assembly of example 11, wherein the axial length of each segment of the plurality of segmented metallic bands is less than or equal to the electrical skin depth of the dominant frequency of a rotor loss.

Example 13. The rotor assembly of any one of examples 11-12, wherein a ratio of the number of segments of the plurality of segmented metallic bands to the number of segments of the plurality of segmented magnets is at least 2.0.

Example 14. The rotor assembly of any one of examples 11-13, wherein a ratio of the number of segments of the plurality of segmented metallic bands to the number of segments of the plurality of segmented magnets is a predetermined number selected such that at least one eddy current harmonic is reduced.

Example 15. The rotor assembly of any one of examples 11-14, wherein the ratio of the first number of segments of the plurality of segmented metallic bands to the number of segments of the plurality of magnet segments is a predetermined number based on the electrical conductivities and the relative permeabilities of the plurality of segmented metallic bands and the plurality of magnet segments.

Example 16. The rotor assembly of any one of examples 11-15, wherein the ratio of the first number of segments of the plurality of segmented metallic bands to the number of segments of the plurality of magnet segments is a predetermined number that satisfies a manufacturing feasibility criteria.

Example 17. The rotor assembly of example 16, wherein the manufacturing feasibility criteria comprises a thermal in the plurality of segmented magnets that is less than a thermal threshold.

Example 18. A electric machine comprising: a rotor assembly, the rotor assembly comprising: a plurality of segmented magnets disposed about an outer surface of a rotor core; a plurality of segmented metallic bands configured to secure the plurality of segmented magnets to the outer surface of the rotor core, wherein the number of segments of the plurality of segmented bands in an axial direction is greater than the number of segments of the plurality of segmented magnets.

Example 19. The electric machine of example 18, further comprising: a stator, wherein the rotor assembly is configured to rotate relative to the stator.

Example 20. The electric machine of any one of examples 18-19, wherein the axial length of each segment of the plurality of segmented metallic bands is less than or equal to the electrical skin depth of the dominant frequency of a rotor loss.

Various examples have been described. These and other examples are within the scope of the following claims.

What is claimed is:

1. A method comprising:
selecting a first number of segments of a plurality of segmented metallic bands that is greater than a number of segments of a plurality of magnet segments, wherein the plurality of segmented magnets are configured to be disposed about an outer surface of a rotor core, wherein the plurality of segmented metallic bands are configured to secure the plurality of segmented magnets to the outer surface of the rotor core;
determining one or more alternating magnetic field harmonic frequencies causing an eddy current loss in a rotor assembly including both the plurality of segmented magnets and the plurality of segmented metallic bands;
determining a first axial length of each segment of the plurality of segmented bands that reduces the eddy current loss of the rotor assembly; and
determining a second number of segments of the plurality of segmented metallic bands based on the first axial length.

2. The method of claim 1, further comprising:
determining a dominant alternating magnetic field harmonic frequency of eddy current loss in the rotor assembly.

3. The method of claim 2, further comprising:
determining a skin depth based on the dominant alternating magnetic field harmonic frequency.

4. The method of claim 3, wherein the first axial length of each segment of the plurality of segmented bands is based on the skin depth.

5. The method of claim 4, wherein the second number of segments of the plurality of segmented metallic bands is based on the first axial length being less than or equal to the skin depth.

6. The method of claim 3, further comprising:
determining a second dominant alternating magnetic field harmonic frequency of eddy current loss in the rotor assembly;
determining a second skin depth based on the dominant alternating magnetic field harmonic frequency;
determining a second axial length of each segment of the plurality of segmented bands that is less than or equal to the second skin depth, wherein the second axial length of each segment of the plurality of segmented bands further reduces the eddy current loss of the rotor assembly; and determining a third number of segments of the plurality of segmented metallic bands based on the second axial length.

7. The method of claim 6, further comprising:

determining whether the eddy current loss of the rotor assembly including the second number of segments of the plurality of segmented metallic bands causes a thermal load in the plurality of segmented magnets that is greater than a thermal threshold, wherein the second axial length of each segment of the plurality of segmented bands is further based on reducing the thermal load in the plurality of segmented magnets.

8. The method of claim 1, wherein a ratio of the first number of segments of the plurality of segmented metallic bands to the number of segments of the plurality of magnet segments is based on the electrical conductivities and the relative permeabilities of the plurality of segmented metallic bands and the plurality of magnet segments.

9. The method of claim 8, wherein the ratio of the first number of segments of the plurality of segmented metallic bands to the number of segments of the plurality of magnet segments is greater than or equal to 2.0.

10. The method of claim 1, further comprising assembling a rotor comprising the rotor core, the plurality of magnet segments, and plurality of segmented metallic bands comprising the second number of segments.

11. A method comprising:

selecting a first number of segments of a plurality of segmented metallic bands that is greater than a number of segments of a plurality of magnet segments, wherein the plurality of segmented magnets are configured to be disposed about an outer surface of a rotor core, wherein the plurality of segmented metallic bands are configured to secure the plurality of segmented magnets to the outer surface of the rotor core;

determining a first axial length of each segment of the plurality of segmented bands that reduces an eddy current loss of a rotor assembly including both the plurality of segmented magnets and the plurality of segmented metallic bands; and determining a second number of segments of the plurality of segmented metallic bands based on the first axial length, wherein a ratio of the first number of segments of the plurality of segmented metallic bands to the number of segments of the plurality of magnet segments is based on the electrical conductivities and the relative permeabilities of the plurality of segmented metallic bands and the plurality of magnet segments.

* * * * *